(12) United States Patent
MacDonald et al.

(10) Patent No.: US 7,390,118 B2
(45) Date of Patent: Jun. 24, 2008

(54) EXTRUDER ASSEMBLY

(75) Inventors: Jeffrey D. MacDonald, North York (CA); Alireza Mortazavi, Richmond Hill (CA); Denise Craig, Toronto (CA); Robert Ilmonen, Mississauga (CA); Geoffrey Gow, Palgrave (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 379 days.

(21) Appl. No.: 10/964,655

(22) Filed: Oct. 15, 2004

(65) Prior Publication Data

US 2006/0083105 A1    Apr. 20, 2006

(51) Int. Cl.
    *B29B 7/42* (2006.01)
(52) U.S. Cl. .................... 366/80; 366/90; 366/303; 425/208; 425/209
(58) Field of Classification Search ............ 366/75, 366/79, 80, 85, 90, 302, 303, 305, 307; 425/207–209
    See application file for complete search history.

(56) References Cited

U.S. PATENT DOCUMENTS

| | | | | |
|---|---|---|---|---|
| 216,958 A * | 7/1879 | Hudson | .................... | 44/631 |
| 690,506 A * | 1/1902 | Wurster | .................... | 241/159 |
| 1,848,236 A * | 3/1932 | Anderson | .................... | 452/44 |
| 2,505,125 A * | 4/1950 | List | .................... | 366/80 |
| 2,693,348 A * | 11/1954 | Ellermann | .................... | 366/85 |
| 3,183,553 A * | 5/1965 | Slater | .................... | 198/550.1 |
| 3,219,320 A * | 11/1965 | Sutter | .................... | 366/289 |
| 3,224,739 A * | 12/1965 | Schuur | .................... | 366/78 |
| 3,456,599 A * | 7/1969 | Baker | .................... | 366/77 |
| 3,570,588 A * | 3/1971 | Wheeler | .................... | 165/87 |
| 3,929,323 A | 12/1975 | Smith | | |
| 3,984,509 A * | 10/1976 | Hall et al. | .................... | 264/40.1 |
| 4,199,263 A | 4/1980 | Menges et al. | | |
| 4,300,839 A | 11/1981 | Sakagami | | |
| 4,402,902 A | 9/1983 | Falk et al. | | |
| 4,538,917 A | 9/1985 | Harms | | |
| 4,573,799 A * | 3/1986 | Anders | .................... | 366/89 |
| 4,629,327 A * | 12/1986 | Capelle | .................... | 366/80 |
| 4,735,565 A * | 4/1988 | Capelle | .................... | 425/208 |
| 4,960,328 A | 10/1990 | Schumacher et al. | | |
| 5,145,352 A * | 9/1992 | Capelle et al. | .................... | 425/205 |
| 5,158,784 A | 10/1992 | Semmekrot | | |
| 5,190,771 A * | 3/1993 | Baumgarten | .................... | 425/171 |

(Continued)

FOREIGN PATENT DOCUMENTS

EP    0 960 715 A2    1/1999

OTHER PUBLICATIONS

International Search Report for PCT/CA2005/001400, dated Dec. 20, 2005, three pages, related to the above-identified US patent application.

(Continued)

*Primary Examiner*—David L Sorkin (57) ABSTRACT

The present invention provides an improved extruder assembly, that includes a wiper for wiping a screw portion in a low pressure extruder stage, whereby the wiping of the screw portion improves melt conveyance through the low pressure extruder stage. The present invention has particular utility when used in a low pressure venting and entrainment extruder stage of a single screw compounding extruder. The present invention also provides an extrusion/injection unit for use in-line compounding molding system that incorporates the improved extruder assembly.

12 Claims, 6 Drawing Sheets

U.S. PATENT DOCUMENTS

| | | | |
|---|---|---|---|
| 5,219,589 A | | 6/1993 | Elia et al. |
| 5,302,019 A | | 4/1994 | Henschel et al. |
| 5,304,054 A | * | 4/1994 | Meyer ........................ 425/208 |
| 5,318,358 A | | 6/1994 | Wobbe et al. |
| 5,358,680 A | | 10/1994 | Boissonnat et al. |
| 5,362,146 A | * | 11/1994 | Nogossek .................... 366/82 |
| 5,577,839 A | * | 11/1996 | Brams et al. ............... 366/76.3 |
| 5,836,680 A | * | 11/1998 | Banas et al. .................. 366/80 |
| 5,932,159 A | | 8/1999 | Rauwendaal |
| 6,136,246 A | | 10/2000 | Rauwendaal et al. |
| 6,444,153 B1 | | 9/2002 | Shah et al. |
| 6,709,147 B1 | | 3/2004 | Rauwendaal |

OTHER PUBLICATIONS

Robert Leaversuch, In-Line Compounding of Long-Glass/PP Gains Strength in Automotive Molding, Plastics Technology [online], Published Sep. 2001.

Chris Rauwendaal, New Single Screw Compounding Extruder, Dec. 10, 2002.

Coperion, Buss Kneader Series MKS, Flexible Systems featuring high process reliability for cost-effective compounding solutions, 2001.

* cited by examiner

EXTRUDER ASSEMBLY

BACKGROUND OF INVENTION

1. Field of the Invention

The present invention relates, generally, to an improved extruder assembly for preparing a melt of molding material. More particularly, but not exclusively, the invention relates to improvements to a single screw compounding extruder wherein at least one wiping element is provided in a low pressure region of an extruder screw passageway, such as adjacent a devolatizing vent or an auxiliary additive feed port, to promote positive conveyance of the compounding material. The present invention has particular utility in the field of in-line compounding wherein apparatus and steps are required for the preparation of melts with entrained additives, for example long glass fiber reinforced polypropylene.

2. Background Information

A large percentage of plastics today are mixed with substantial levels of fillers (e.g. glass, carbon, and natural fibers, minerals, colorants, organic additives, etc.). These compounds are typically produced using a compounding extruder such as a twin screw intermeshing compounding extruder as described in U.S. Pat. No. 6,136,246 to Rauwendaal et al. Typically, the extruders are configured to produce pellets or billets of the molding compound that are subsequently used, in a substantially decoupled manner, as a feedstock into a typical injection or compression molding machine. Alternatively, the compounding extruder may be configured to feed the molten molding compound directly into the molding machine, this process is commonly known as 'in-line compounding' or 'direct extrusion'. For example, U.S. Pat. No. 5,358,680, to Boissonnat et al., describes an inline compounding system that includes a twin screw compounding extruder, the extruder being configured for producing a molding compound of a thermoplastic that is blended with reinforcing fibers, and an injection molding machine that is configured to receive the molding compound directly from the extruder, the injection molding machine otherwise producing molded articles in the known manner.

Traditionally, the twin screw compounding extruder has been preferred over those with a single screw, despite some major shortcomings (e.g. considerably more expensive, screw wear, requirement for downstream pumping, etc.) because of their versatility and efficiency. Some inherent advantages of the twin screw extruder include a self-wiping of the outer surfaces of the intermeshed screw flights and shank, positive conveyance of molding materials in low melt pressure regions, good dispersive and distributive mixing, compact (i.e. short UD), flexible process control (i.e. owing to their starve-fed operation), and high throughput. Another reason why the twin screw compounding extruder has been favored has been the availability of modular screws and barrels whereby the extruder may be flexibly configured by simply adding or removing processing sections to achieve an optimal compounding process. Examples of commonly available barrel modules include primary feed, plain, vent, side stuff, and auxiliary feed sections. Similarly, some commonly available screw sections include various flight elements (i.e. feed, compression, venting, pumping, etc.), mixing elements, and zoning elements (i.e. isolate operations within the extruder).

By contrast, the single screw compounding extruder has traditionally been regarded as providing limited processing flexibility and a much narrower processing window. As discussed in detail in a recent paper entitled 'New Single Screw Compounding Extruder', by Chris Rauwendaal of Rauwendaal Extrusion Engineering Incorporated, this perception of the single screw extruder has been shaped by the commonplace practice of flood feeding the extruder, practical limitations on the extruder length, a lack of extruders configured with multiple feed ports, the use of screws and barrels of a unitary construction (i.e. configurations are not easily altered). This paper also proposes how many of these limitations can be addressed. For instance, a modular screw and barrel configuration, derived from the twin screw extruder art, could be used to provide additional processing flexibility. In addition, additional mixers and/or more efficient mixers, as described hereinafter, could be incorporated into the screw and/or barrel to minimize the extruder length required to achieve an acceptable level of additive distribution and dispersion. As well, the extruder may be configured to include a succession of vent/auxiliary ports along the barrel for a staged addition of the compound materials and volatile removal. A method for compounding in a single screw extruder is also proposed therein, with improved processing flexibility, that includes the step of starve feeding the extruder.

As introduced hereinbefore, there are a wide variety of mixer/kneader designs available in the art that are configurable in the single screw compounding extruder to improve its mixing efficiency and thereby minimize extruder length. The mixers may be formed or integrated directly onto the screw, barrel, or both. For instance, U.S. Pat. No. 5,932,159 to Rauwendaal, describes a mixer that integrates directly onto the screw. This mixer, commonly known as a 'CRD mixer™' (a trademark of Rauwendaal Extrusion Engineering Inc.), is realized by simply altering the screw flight configuration such that a front pushing face of the flight interacts with the inner surface of the screw passageway in the barrel to form a progressively narrowing passage through which material is forced into multiple regions of high elongational and shear stress whereby dispersive and distributive mixing is provided. As an alternative, a 'Buss Ko-Kneader' (a trademark of Coperion Holding GmbH) and generally described in the background section of U.S. Pat. No. 6,709,147, describes a mixer with elements that integrate into both the screw and barrel. In particular, this mixer requires the barrel of the extruder to include one or more axial rows of kneading elements that are arranged along an inner surface of the screw passageway in a high pressure stage of the extruder, as well as complementary shaped slots formed in the screw flights. In operation, the kneading elements move through the slots of the screw flights to create an efficient mixing action of the melt being pumped therebetween. The kneading elements, teeth or pins, are often press-fit, or threaded into the barrel of the extruder. It is also a common practice to integrate the kneading elements into a modular barrel portion that is configured to have a clam shell construction for sake of ease of installation and service.

Accordingly, there is strong potential for the single screw compounding extruder, when properly configured, to match the processing flexibility of the twin screw extruder but at much lower capital and operating costs. Despite this promise, there does remain at least one major problem. In particular, the lack of screw flight and shank wiping in a single screw compounding extruder can cause significant melt flow problems through the low pressure extruder stages (i.e. adjacent vents and auxiliary ports) when processing with at least one compounding material that exhibits a tendency to stick or otherwise coalesce along the boundary surface of the screw (i.e. screw root or flight). Unfortunately, this problem is particularly acute when the extruder is being starve fed.

Therefore, there is a need in the art to provide a wiper for wiping at least a portion of the screw flights and/or shank in the low pressure stages of a single screw compounding extruder adjacent the vent and/or auxiliary port to promote a proper conveyance of the molding material therethrough. This problem is also apparent in a single screw extruder (i.e. non-compounding) for the very same reasons.

When configured and used as intended, the mixing pins of the prior art 'Buss Ko-Kneader' (a trademark of Coperion Holding GmbH), as introduced hereinbefore, are located in extruder stages with sufficiently high melt pressure to ensure that the melt will continue to flow to the extent required to effect a thorough mixing/kneading of the melt as it is sheared between the pins and screw flight sections. However, nowhere is it known to in the art to use a similar configuration in the relatively low pressure stages of the extruder (i.e. near ambient pressure) for fulfilling the entirely different purpose of scraping and otherwise wiping the stalled compounding materials off of the screw flight and/or shank to promote its further interaction with screw and barrel portions to ensure an efficient transit of the low pressure stage extruder stage. In particular, nowhere is it known in the art to install screw wiping elements in the venting/entrainment extruder stages of a single screw compounding extruder.

A similar problem has been known to occur when feeding certain feedstock materials into the primary feed throat of the extruder wherein the feedstock becomes 'tacky' upon heating with a tendency to stick to the screw outer surfaces whereby the in-feed of molding material becomes impeded or blocked. A solution to this problem has been addressed in U.S. Pat. No. 3,929,323 to Smith. In particular, Smith describes a single screw extruder that includes an auxiliary feed screw that functions to wipe the screw flights of the extruder screw to ensure a positive conveyance of the molding material.

The following is a description of an experiment that was conducted on an in-line compounding molding system, the results from which are illustrative of the problem defined hereinbefore and that may now be advantageously addressed by implementing the improvements to the extruder in accordance with the embodiments of the present invention as described hereinafter.

Figure 1:
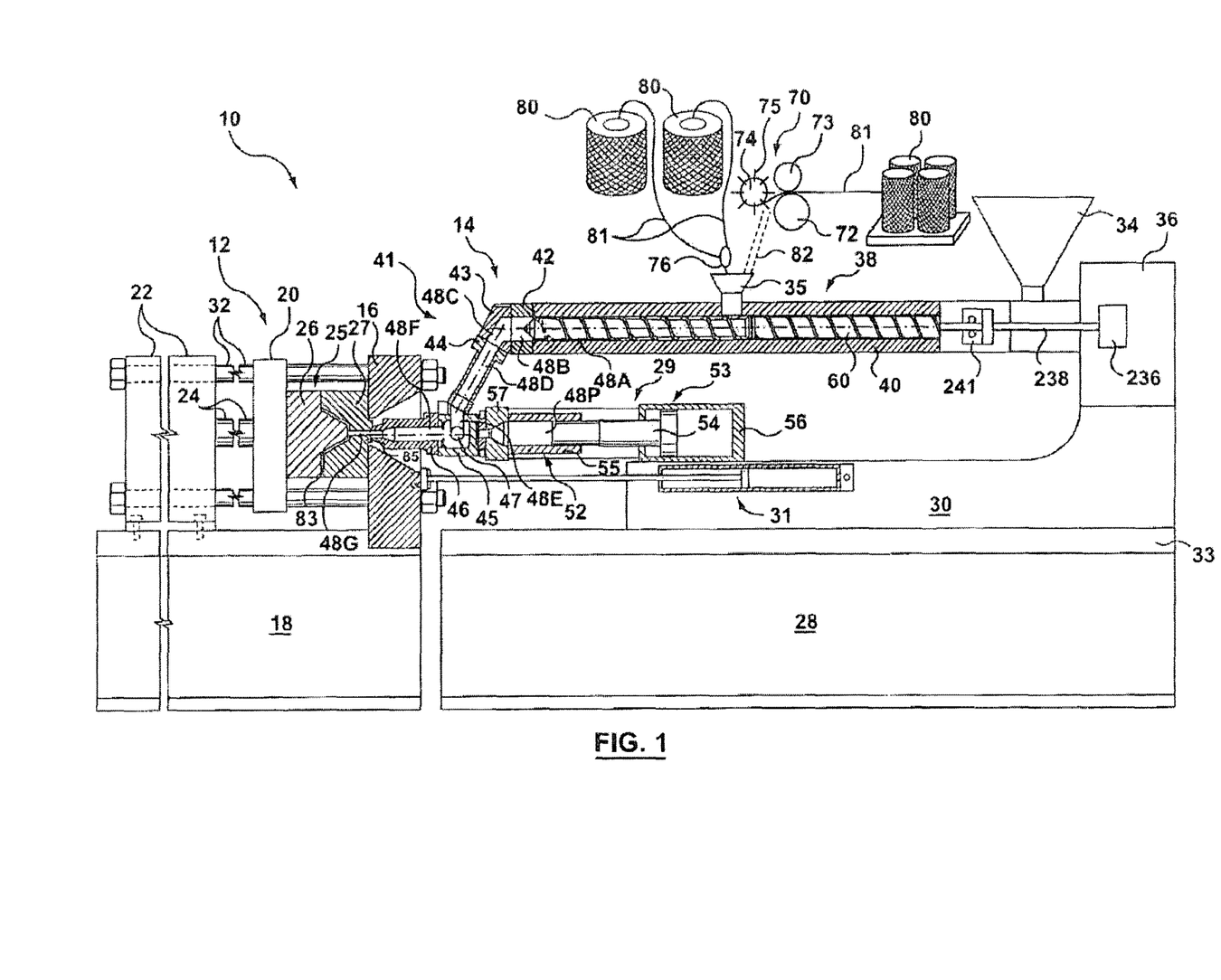
FIG. 1 is a partial section view through an in-line compounding molding system 10 in accordance with preferred embodiment of the present invention.

With reference to FIG. 1 an in-line compounding molding system 10 is shown to include an experimental Husky™ (a registered trademark of Husky Injection Molding Systems Ltd.) P100/110 E100 two-stage extrusion/injection unit 14 that is coupled to a Husky™ (a registered trademark of Husky Injection Molding Systems Ltd.) GL300 PET clamp unit 12.

The clamp unit is typical for an injection molding system, and is shown to include a clamp base 18 with a stationary platen 16 securely retained to an end thereof, a clamp block 22 slidably connected at an opposite end of the clamp base 18, and a moving platen 20 arranged to translate therebetween on a set of tie bars 32 that otherwise interconnect the stationary platen 16 and the clamp block 22. As is known, the clamp unit 12 further includes a means for stroking (not shown) the moving platen 20 with respect to the stationary platen to open and close the injection mold halves 26, 27 arranged therebetween. A clamping means (not shown) is integrated within the clamp block 22 for generating a clamping force that is linked through a clamp column 24 to the moving platen for providing, in use, a clamping force between the mold halves 26, 27 during the injection of the melt of molding material, as is commonly known. The hot half of the injection mold 27 is mounted to a face of the stationary platen 16, whereas the complementary cold half of the mold 26 is mounted to an opposing face of the moving platen 20. The injection mold 25 is also shown to include a molding cavity 83 that is formed between the mold halves 26, 27, and a melt passageway 48G that passes through a sprue bushing portion 85 of the mold hot half 27 for interconnecting the molding cavity 83 to the melt passageway 48F of a machine nozzle 46.

The extrusion/injection unit 14 is a modified two-stage injection unit, and is shown to include a single screw compounding extruder assembly 38 that is arranged above, and in fluid communication with, an injection assembly 29. The extruder and injection assemblies 38 and 29 are both supported on a carriage 30 that is itself supported on ways 33 that are provided on the top bed of an injection unit base 28. Accordingly, the extruder and injection assemblies 38 and 29 can be moved together, relative to the clamp unit 12, for controllably coupling a machine nozzle 46 with the sprue of the mold hot half 27. A carriage cylinder 31 connecting the carriage 30 to the stationary platen 16 of the clamp unit 12 provides for the positioning of the carriage 30.

Figure 2A:
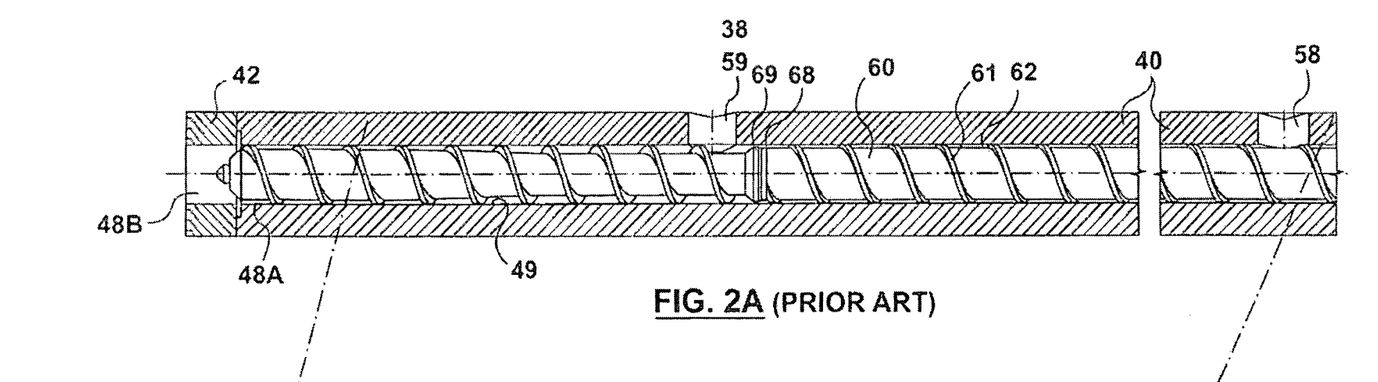
FIG. 2A is a partial perspective view of a portion of the barrel and screw of the extruder assembly, in accordance with the prior art.
Figure 2B:
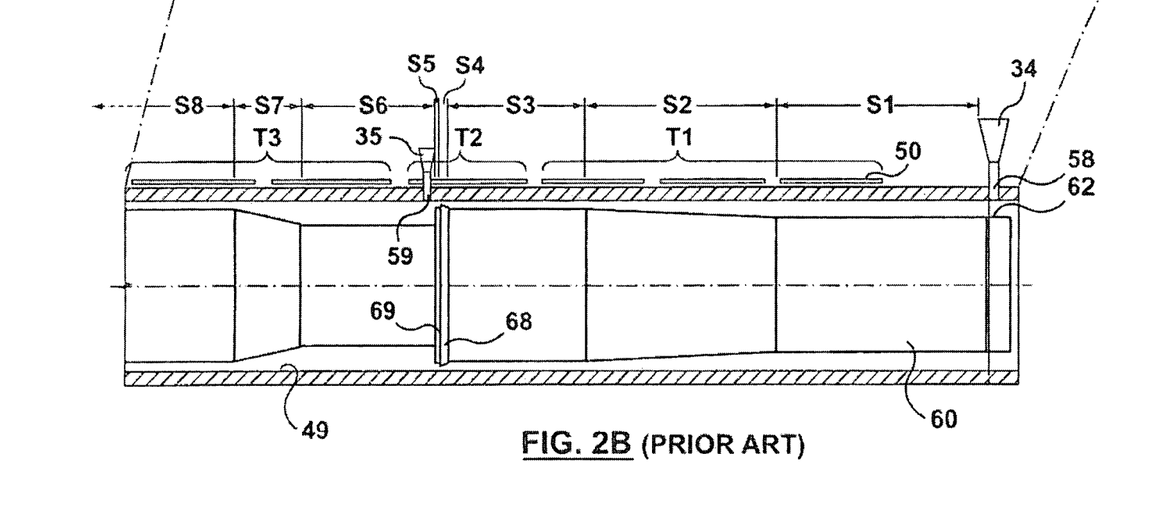
FIG. 2B is a representation of a portion of the barrel and screw of the extruder assembly, as delineated from FIG. 2A, with a somewhat exaggerated variation in the screw root diameter, and with the screw flights omitted, for illustrative purposes.

The extruder assembly 38 includes a screw drive assembly 36 that is configured for the rotation of an extruder screw 60 within a screw passageway 48A that extends along a cylindrical inner surface 49 of an extruder barrel 40. In operation, the rotation of the extruder screw 60 draws a first compounding material from a material hopper 34 into the screw passageway 48A, via a feed throat 58, as shown in FIG. 2A, and thereafter conveying the first compounding material through consecutive extruder stages, as shown in FIG. 2B and described in detail hereinafter, to a discharge end of the barrel 40. In the experiment the first molding material was a polypropylene thermoplastic. In contrast to a conventional two-stage injection unit where the screw is reciprocated, in use, by the drive assembly 36, to effect a transfer of an accumulated volume of the molding material in the extruder assembly 38 to the injection assembly 29 for subsequent injection, the present apparatus was operated in a mode whereby the extruder screw 60 is longitudinally fixed from reciprocating in the screw passageway 48A and wherein the steps of extrusion and injection are performed sequentially. The advantage of operating the extrusion/injection unit 14 in this manner will be evident in view of the description of the preferred embodiment of the present invention described hereinafter. The extruder assembly 38 also includes an auxiliary hopper 35 which functions to provide intermediate storage for a second compounding material which is introduced into the screw passageway 48A via an auxiliary port 59 that is arranged through the barrel 40 intermediate the primary feed throat 58 and the discharge end of the barrel 40. In the experiment the second molding material was reinforcing glass fibers 82. As is commonly known, the auxiliary port 59 also functions as a vent for the venting of volatile elements of the first compounding material. The extruder assembly 38 is also shown to include a barrel head 41 comprising an annular portion 42, an elbow portion 43, and a transfer portion 44, with a sequence of melt passageway portions 48B, 48C, and 48D configured therethrough, respectively, for fluidly connecting the discharge end of the barrel 40 to a melt passageway 48E of an injection assembly distributor valve 45.

The typical injection assembly 29 includes the distributor valve 45, a machine nozzle 46, a shooting pot 52, and a shooting pot piston assembly 53. In particular, the distributor valve 45 includes a melt passageway portion 48E which is configured for alternately connecting, by controllably orienting a valve spool 47, a melt accumulation chamber 48P, configured within the shooting pot 52, with either the melt passageway 48D of the barrel head 41, for charging the accumulation chamber 48P with the molding compound, or to a melt passageway 48F that extends through the machine nozzle 46, for a subsequent injection of the accumulated melt into the melt passageway 48G of the mold sprue. The shooting pot 52 includes, from front to back, an annular head portion 57, a cylinder portion 55, and a head of a piston 54 that is configured to reciprocate within a bore of the cylinder portion 55. The accumulation chamber 48P is the volume of the cylinder 55 in front of the piston 54, and also includes a tapered passageway that extends through the annular head portion 57. The accumulation chamber 48P is obviously variable in volume, dependent on the position of the piston 54. In operation, the piston 54 is forced to retract within the cylinder 55 when the accumulation chamber 48P is being charged, during the step of melt transfer from the extruder, and subsequently the piston is forced to advance into the cylinder to empty the accumulation chamber 48P, during the step of injection. The piston 54 is a member of a shooting pot piston assembly 53 that also includes an injection cylinder 56, as is commonly known.

The barrel 40, barrel head 41, distributor valve 45, shooting pot 52, and the machine nozzle 46 each configured to include heaters 50 arranged therealong, as shown with reference to FIG. 2B, for a controlled heating, in use, of the molding materials along the screw and melt passageway portions 48A, 48B, 48C, and 48D, 48E, 48F, as well as the accumulation chamber 48P, as is commonly known.

With reference to FIG. 2A the configuration of the barrel 40 and extruder screw 60 can be seen in detail. The extruder screw 60 includes a cylindrical shank with an outer surface providing a screw root 62 around which extends a helical screw flight 61. With reference to FIG. 2B (note: the variation in the root 62 diameter has been exaggerated and the screw flight 61 omitted for illustrative purposes), it is shown that the diameter of the screw root 62 varies over the length of the extruder screw 60 to provide the stages of melt feeding, compression/melting, and metering, as commonly known. The screw is also shown to include a conical shearing portion 68 followed by a cylindrical shearing section 69, both of which function to assist in establishing a boundary between the adjacent extruder stages to assists in a downstream venting of volatile elements, as commonly known.

Again with reference to FIG.(s) 2B, the boundaries and extent of each of the extruder stages S1, S2, S3, S4, S5, S6, S7, and S8, and the barrel thermal control zones T1, T2, and T3, are shown as configured for the sake of the experiments undertaken with the compounding materials as listed in Table 1, which were starve fed into the barrel 40 at a throughput rate of about 180 kg/h:

TABLE 1

| First Compounding Material (Blend) | | Second Compounding Material |
|---|---|---|
| 68% PP Montell VM6100 | 2% Polyblond 3200 | 30% glass fiber (EC 15-12 P368) |
| 68% PP Montell H32GA | 2% Polyblond 3200 | 30% glass fiber (EC 15-12 P368) |

Table 1

Accordingly, the extruder screw 60, the extruder stages S1, S2, S3, S4, S5, S6, S7, and S8, and the barrel thermal control zones T1, T2, and T3 were configured as listed in Tables 2, 3, and 4, respectively:

TABLE 2

| Total screw length (L/D): | 25 |
|---|---|
| Screw diameter (mm): | 100 |
| Length of first section (L/D): | 16 |
| Number of flights: | 2 |

TABLE 2-continued

| Flight pitch (mm): | 90 |
|---|---|
| Flight depth feed section (mm): | 10.2 |
| Flight depth metering section (mm): | 3.9 |
| Compression ratio: | 2.6 |
| Annular slit (mm): | 2.1 |
| Length of second section (L/D): | 9 |
| Number of flights: | 1 |
| Flight pitch (mm): | 90 |
| Flight depth venting section (mm): | 13.3 |
| Flight depth metering section (mm): | 5.3 |
| Pump ratio: | 1.51 |

Table 2

TABLE 3

| S1 | Feeding Stage (low pressure) |
|---|---|
| S2 | Compression Stage (high pressure) |
| S3 | Metering Stage (high pressure) |
| S4 | Conical Shearing Stage (high pressure) |
| S5 | Cylindrical Shearing Stage (high pressure) |
| S6 | Venting and Entrainment Stage (low to ambient pressure) |
| S7 | Re-Compression Stage (high pressure) |
| S8 | Metering Stage (high pressure) |

Table 3

TABLE 4

| T1 | First Barrel Thermal Control Zone at 250° C. |
|---|---|
| T2 | Second Barrel Thermal Control Zone at 240° C. |
| T3 | Third Barrel Thermal Control Zone at 230° C. |

Table 4

The experiment was conducted using the in-line compounding molding system 10 described above whilst operating an extrusion/injection molding process that included the steps of:

(i) configuring a first contiguous melt passageway between the extruder assembly 38 melt passageway portions 48A, 48B, 48C, 48D, the injection assembly melt passageway portion 48E, located in the distributor valve 45, and the accumulation chamber 48P, located in the shooting pot 52;

(ii) extruding the molding compound, through the first contiguous melt passageway, for charging the accumulation chamber 48P with a required volume of the compounding material by substantially simultaneously:

a. providing an inflow, starve fed, of the first compounding material into the screw passageway 48A, of the barrel 40, through the primary barrel feed throat 58;

b. providing an inflow, starve fed, of the second compounding material into the screw passageway 48A, whilst venting volatiles from the first compounding material, through the downstream auxiliary port 59;

c. rotating the extruder screw 60 to convey the first and second compounding materials through a plurality of extruder stages;

d. heating the barrel 40 to attain and thereafter sustain a processing temperature of the first, second, and ultimately the composite compounding materials;

(iii) reconfiguring the melt passageway to isolate the melt passageway portions of the extruder assembly 38 and to configure a second contiguous melt passageway between the injection assembly accumulation chamber 48P, the melt passageway portion 48E and the melt passageway portion 48F, located in the machine nozzle;

(iv) injecting a portion of the compounding material in the accumulation volume 48P, through the second contiguous melt passageway, into the melt passageway 48G, located in mold sprue 85, for filling the molding cavity 83 of the at least substantially closed injection mold;

(v) substantially simultaneously reconfiguring the first melt passageway for recharging of the accumulation chamber 48P and the cycling of the mold clamp unit 12 to effect the removal of a molded article from the injection mold in preparation for a subsequent molding cycle.

The results of the experiment revealed the problem, introduced hereinbefore, wherein the lack of screw flight and shank wiping in the venting and entrainment stage S6, adjacent the auxiliary port/vent 59, caused significant melt flow problem therethrough. In particular, it was observed that the first compounding material (i.e. polypropylene blend) glued on the screw root 62 without, or with occasionally intermittent, axially feeding by the screw flights 61.

SUMMARY OF THE INVENTION

The present invention provides a wiper for use in an extruder assembly, for the wiping of at least a portion of an extruder screw flight and/or a screw root, in a low pressure extruder stage, whereby a flow of molding material can be maintained therethrough. The present invention is particularly suited for use in a low pressure venting and entrainment extruder stage of a single screw compounding extruder. The improved extruder assembly, including the wiper of the present invention, may be advantageously incorporated into a extrusion/injection unit of an in-line compounding molding system.

In accordance with a primary aspect of the invention, an extruder assembly is provided that is characterized in that it includes a wiper in a low pressure extruder stage for the wiping of an adjacent screw portion whereby melt conveyance through the low pressure extruder stage is improved. The wiper preferably includes a static wiping element with at least a portion of the static wiping element being arrangeable within the screw passageway and being configured to cooperate, in use, with an adjacent screw portion for the wiping thereof. The extruder assembly generally includes a heated barrel, an extruder screw, and a drive assembly that is operatively connected to the screw for rotating, and optionally reciprocating the screw within a screw passageway arranged in the barrel. The barrel includes a primary feed throat configured through a sidewall of the barrel, in proximity to a first end of the barrel, for accommodating, in use, the in-feeding of a first molding material into the screw passageway. The barrel optionally includes an auxiliary port configured through a sidewall of the barrel, intermediate the ends of the barrel, for accommodating, in use, at least one of a venting of gaseous volatiles from the screw passageway, or the in-feeding of a second molding material.

In accordance with another aspect of the invention, an extruder assembly is provided that is characterized in that it includes a wiper in a low pressure extruder stage adjacent an auxiliary port, the wiper being configured for the wiping of an adjacent screw portion whereby melt conveyance through the low pressure extruder stage is improved. The extruder assembly generally includes a heated barrel, an extruder screw, and a drive assembly that is operatively connected to the screw for rotating, and optionally reciprocating the screw within a screw passageway arranged in the barrel. The barrel includes a primary feed throat configured through a sidewall of the barrel, in proximity to a first end of the barrel, for accommodating, in use, the in-feeding of a first molding material into the screw passageway. The barrel also includes the auxiliary port configured through a sidewall of the barrel, intermediate the ends of the barrel, for accommodating, in use, at least one of a venting of gaseous volatiles from the screw passageway, or the in-feeding of a second molding material. The wiper preferably includes a static wiping element with at least a portion of the static wiping element being arrangeable within the screw passageway and being configured to cooperate, in use, with an adjacent screw portion for the wiping thereof. Alternatively, the wiper may include a rotatable wiping element that is configured in the barrel for rotation, in use, about a parallel rotational axis with the extruder screw. At least a portion of the rotatable wiping element being arrangeable within the screw passageway and being configured to cooperate, in use, with an adjacent extruder screw portion for the wiping thereof.

In accordance with yet another aspect of the invention, an extrusion/injection unit for use an in-line compounding molding machine is provided that includes the extruder assembly with the wiper in accordance with the present invention.

In accordance with yet another aspect of the invention, a wiper is provided in accordance with the present invention.

BRIEF DESCRIPTION OF THE DRAWINGS

Exemplary embodiments of the present invention will now be described with reference to the accompanying drawings, in which.

DETAILED DESCRIPTION OF THE PRESENTLY PREFERRED EMBODIMENT

Figure 3:
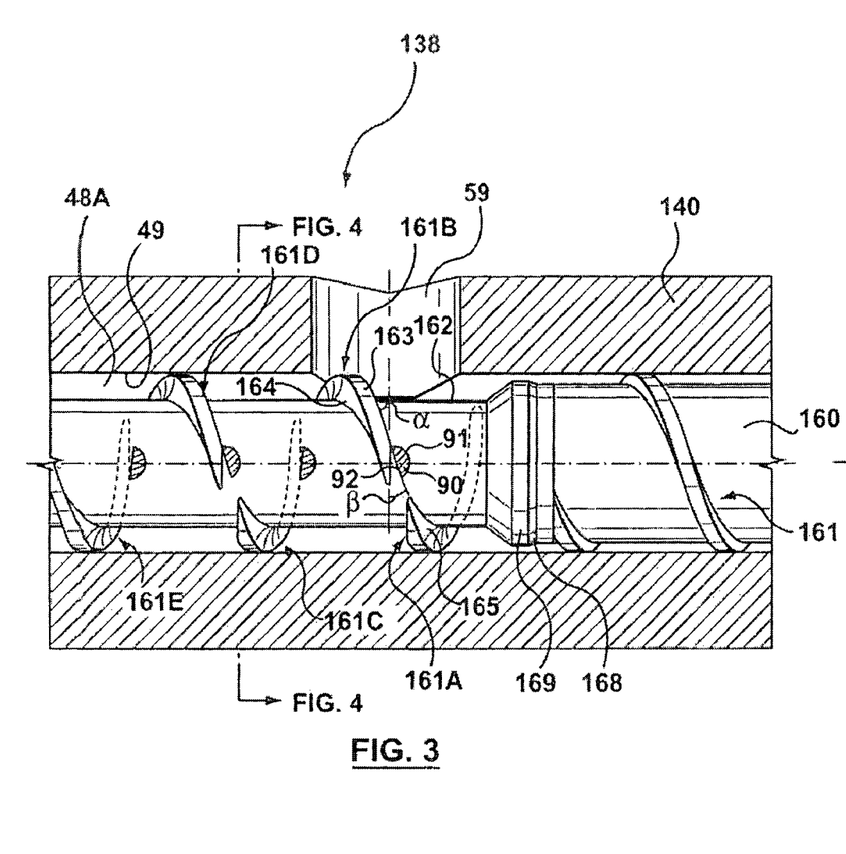
FIG. 3 is a partial section through a portion, in the vicinity of the auxiliary port/vent, of the barrel and screw of the extruder assembly that shows the screw wiping apparatus in accordance with a preferred embodiment of the present invention.
Figure 4:
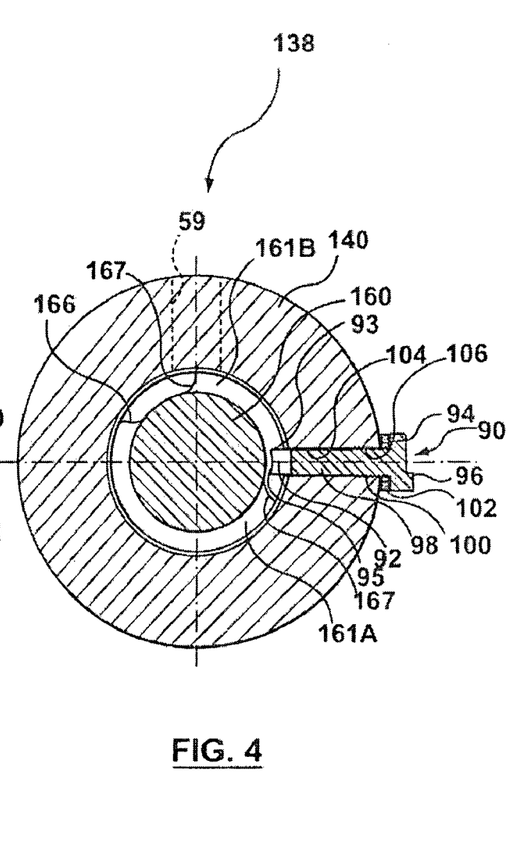
FIG. 4 is a cross-section through the extruder assembly, taken as indicated with reference to FIG. 3, that shows the screw wiping apparatus in accordance with the preferred embodiment of the present invention.

Referring to FIGS. 3 and 4, a portion of an extruder assembly 138, in accordance with a preferred embodiment of the present invention, is shown that has been configured to alleviate the melt flow problem in the low pressure venting and entrainment extruder stage S6, adjacent the auxiliary port 59, as discussed hereinbefore. Accordingly, the extruder assembly 138 has been configured to include a wiper for wiping the extruder screw 160, as described in detail hereinafter, that functions to wipe the compounding material from selected portions of the extruder screw 160 for its reintegration into the melt stream and thereby reinvigorating the flow to the extent required to ensure its traversal of a downstream screw flight portion 161A, 161B, 161C, 161D, or 161E without further stagnation. The extruder assembly 138 is otherwise configured and operated as previously described and therefore only those aspects of the extruder assembly 138 that have been added, removed, or otherwise modified to provide the wiper will be addressed hereinafter. Similarly, the screw extruder 138 is configured for use with the experimental in-line compounding molding system 10 as described hereinbefore, and accordingly the molding system 10 will not be described in any further detail.

The preferred wiper for wiping the extruder screw 160 includes a row of four equi-spaced elongate static wiping elements 90 that are each arranged in complementarily configured bores 104 that extend, in a substantially perpendicular orientation, through a sidewall of the barrel 140.

Each wiping element 90 includes a projecting portion 93 at a distal end thereof for extending into the screw passageway 48A in positions that are coincident with generally complementary shaped clearance portions provided in the screw flight 161, thereby subdividing the screw flight into the set of discrete screw flight portions 161A, 161B, 161C, 161D, 161E introduced hereinbefore. In operation, the action of extruder screw 160 rotation causes the adjoining surface portions of the screw shank root 162 and a lead-in and a lead-out face 166, 167 of the adjacent screw flight portions 161A, 161B, 161C, 161D, 161E to sweep around and past, respectively, the projecting portions 93 of the wiping elements 90 whereby compounding material (not shown) is wiped away therefrom.

In more detail, each of the static wiping elements 90 is preferably configured to be similar in shape to a bolt fastener, with a cylindrical shank and hexagonal head portions, as shown with reference to FIG. 4. Specifically, the wiping element 90 includes, from top to bottom, a hexagonal head portion 94 with a small radial indicator projection 96 arranged on its top surface, a cylindrical shank 98 with a threaded upper portion 100 and a lower projecting portion 93. The shank 98 is narrower than the head portion 94 so as to provide an annular face around the bottom of the head portion 94 that cooperates, in use, with a lock washer 102. The wiping elements 90 are retained, in use, in the complementarily configured bores 104 provided through a sidewall of the barrel 140 such that the projecting portion 93 of the wiping element 90 is positioned within the screw passageway 48A. A close fit between the bore 104 and the wiping element 90 will also function to prevent any melt from leaking therebetween. An upper portion of each of the wiping element bores 104 is configured to include a complementary threaded portion 106 for cooperating with the threaded portion 100 on the wiping element, and an outer surface of the barrel provides a second mating face for the lock washer 104, whereby the wiping element 90 may be reliably retained in the barrel 140 with the projecting portion 93 set to any desired angular orientation as gauged by the indicator 96 on the head portion 94.

Preferably, the projecting portion 93 also includes a conveyance face 92 that is provided along a shallow planar relief extending across the projecting portion 93 generally parallel to the longitudinal axis of the wiping element. The angular orientation $\beta$ of the wiping element 90 is preferably set to position the conveyance face 92 to be at the same helix angle $\alpha$ as the adjacent screw flight portions 161A, 161B, 161C, etc., whereby the flowing compounding material may traverse thereacross, from an upstream flight portion (e.g. 161A) to a downstream portion (e.g. 161B), without undue impediment. In so doing, a cylindrically shaped rear face 91 on the opposite side of the projecting portion 93 is arranged upstream whereby any entrained solids (e.g. second molding compounds such as reinforcing glass fibers) are reliably deflected therearound (i.e. the melt flow is encouraged to flow over the rear face without there being any opportunity for stagnation). In addition, it has been found that particularly effective wiping of the screw root 162 is achieved by configuring a bottom face 95 of the wiping element 90 to have a concave contour which closely follows that of the screw shank root 162 when positioned in close proximity thereto.

Figure 5:
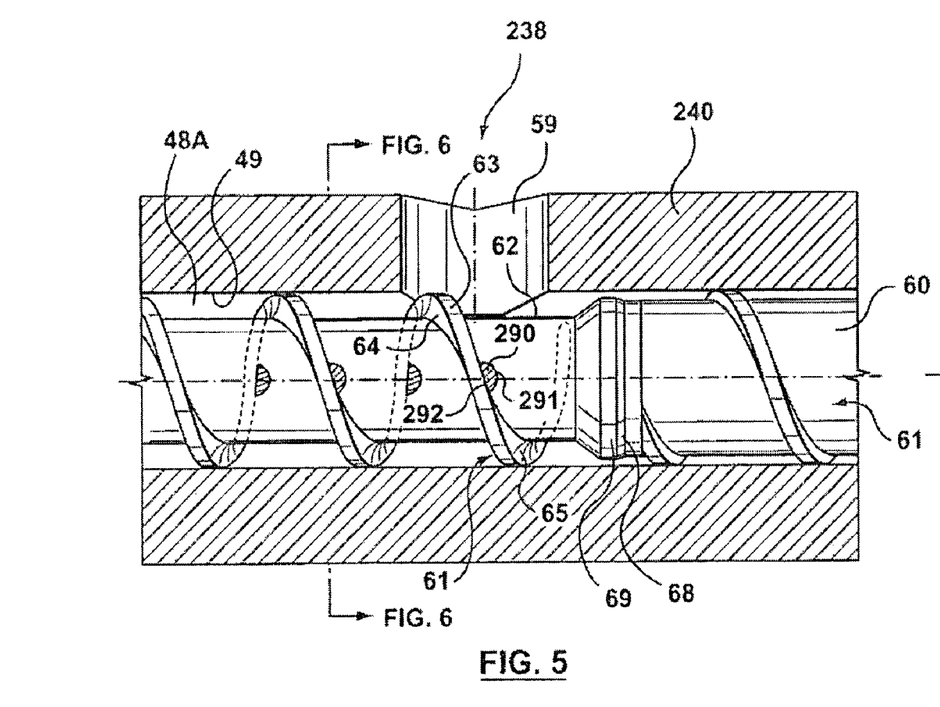
FIG. 5 is a partial section through a portion, in the vicinity of the auxiliary port/vent, of the barrel and screw of the extruder assembly that shows the screw wiping apparatus in accordance with a first alternative embodiment of the present invention.
Figure 6:
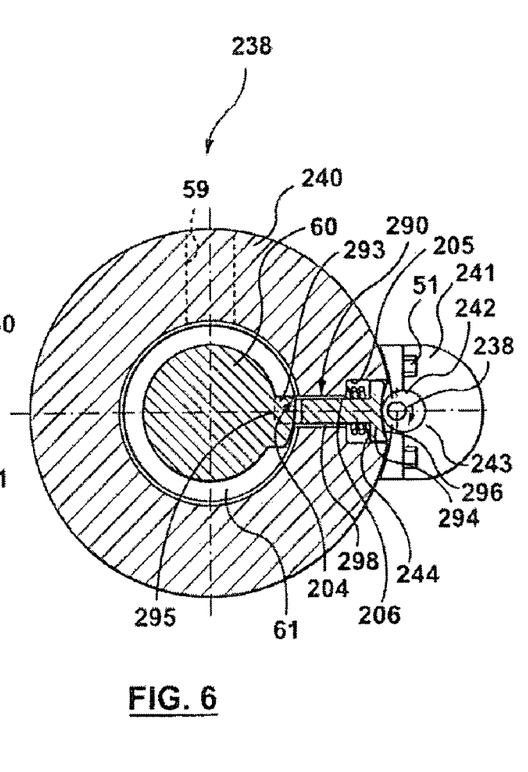
FIG. 6 is a cross-section through the extruder assembly, taken as indicated with reference to FIG. 5, that shows the screw wiping apparatus in accordance with the first alternative embodiment of the present invention.

Referring to FIGS. 5 and 6, a portion of an extruder assembly 238, in accordance with a first alternative embodiment of the present invention, is shown that includes a first alternative wiper for wiping the extruder screw 60 for alleviating the melt flow problem in the low pressure venting and entrainment extruder stage S6 adjacent the auxiliary port 59. As before, other than the provision for the wiper for wiping the extruder screw 60, the configuration and operation of the extruder assembly 238 is otherwise consistent with the description provided hereinbefore, for the experimental extruder assembly 38, and is accordingly intended for use in the in-line compounding molding system 10.

The first alternative wiper for wiping the extruder screw 60 includes a row of four equi-spaced elongate static wiping elements 290 that are each slidably arranged, along their longitudinal axis, in complementarily configured bushing bores 204 that extend, in a substantially perpendicular orientation, through a sidewall of the barrel 240. The wiper also includes a drive for reciprocating the wiping elements 290, between a retracted and an extended to position, to alternately position projecting portions 293, configured at the distal ends of the wiping elements 290, substantially within the confines of the bushing bore 204 or within the screw passageway 48A, respectively. In operation, the action of extruder screw 60 rotation causes the adjoining surface portions of the screw shank root 62 and a leading and trailing face 64, 65 of the screw flight 61 to sweep around and across, respectively, the statically oriented, reciprocating wiping elements 290 whereby compounding material (not shown) is wiped away therefrom. The reciprocation of the wiping elements 290 is synchronized with the rotation of the extruder screw 60 such that each wiping element 290 is retracted only for the duration of the passage of the screw flight 61 therebeneath so as to avoid striking and otherwise interfering with its passage.

In more detail, each of the static wiping elements 290 includes, from top to bottom, a generally cylindrical head portion 294, with a concave shaped cam follower surface 296 formed on the top thereof, and an elongate cylindrical shank 298 that includes the projecting portion 293 configured along the distal end thereof. A shallow planar relief (not shown) extending across a side of the head portion 294 acts as a key that functions in cooperation with a complementary shaped keyway portion (not shown) formed along an upper portion of the bushing bore 204 to prevent the wiping element 290 from rotating as it reciprocates whereby a conveyance face 292, configured on the projecting portion 293 as described hereinafter, can be kept in a desired orientation. The shank 298 is narrower than the head portion 94 so as to provide an annular face around the bottom of the head portion 94 that cooperates, in use, with coaxial spring 244 for biasing the wiping element 290 into the retracted position.

In more detail, each bushing bore 204 includes an upper and a lower portion 205, 206, for accommodating the head and shank 294, 298 of a wiping element 290, respectively. A close fit between the lower portion of the bushing bore 206 and the shank 298 of the wiping element 290 functions both to guide the wiping element 290 as it reciprocates and to substantially prevent any melt from leaking therebetween. An annular face at the base of the relatively wide upper portion 205 provides a seat for the wiping element biasing spring 244.

The drive for reciprocating the wiping element 290 includes an eccentrically-shaped cam 242, rotationally arranged beside each wiping element 290, with a portion of an outer camming surface 243 engaging the complementary cam follower surface 296 on the head portion 294 of a wiping element 290. The eccentric profile of the cam 242 causes the wiping element 290 to extend and retract as a diverging and a recessed portion, respectively, of the camming surface 243 sweeps past the cam follower surface 296, the retraction of the wiping element being assisted by the action of the spring 244 bias. The cams 242 are each keyed (not shown) to a drive shaft 238, that extends along the side of the barrel 240 adjacent the line of wiping elements 290, in a relative angular orientation that matches that of the adjacent screw flight portion so that each wiping element 290 can be retracted in sequence. As shown with reference to FIGS. 1 and 6, the drive shaft 238, supported by bearing blocks 240 that are connected along an outer surface of the barrel 40 by fasteners 51, is rotated synchronously with the extruder screw 60 by an auxiliary drive 236 located adjacent the screw drive assembly 36.

Preferably, the projecting portion 293 also includes a conveyance face 292 that is provided along a shallow planar relief extending across the projecting portion 293 generally parallel to the longitudinal axis of the wiping element. The angular orientation of the wiping element 290 is preferably set to position the conveyance face 292 to be at the same helix angle as the screw flight 61 whereby the flowing compounding material may traverse thereacross without undue impediment. In so doing, a cylindrically shaped rear face 291 on the opposite side of the projecting portion 293 is arranged upstream whereby any entrained solids are reliably deflected therearound.

Figure 7:
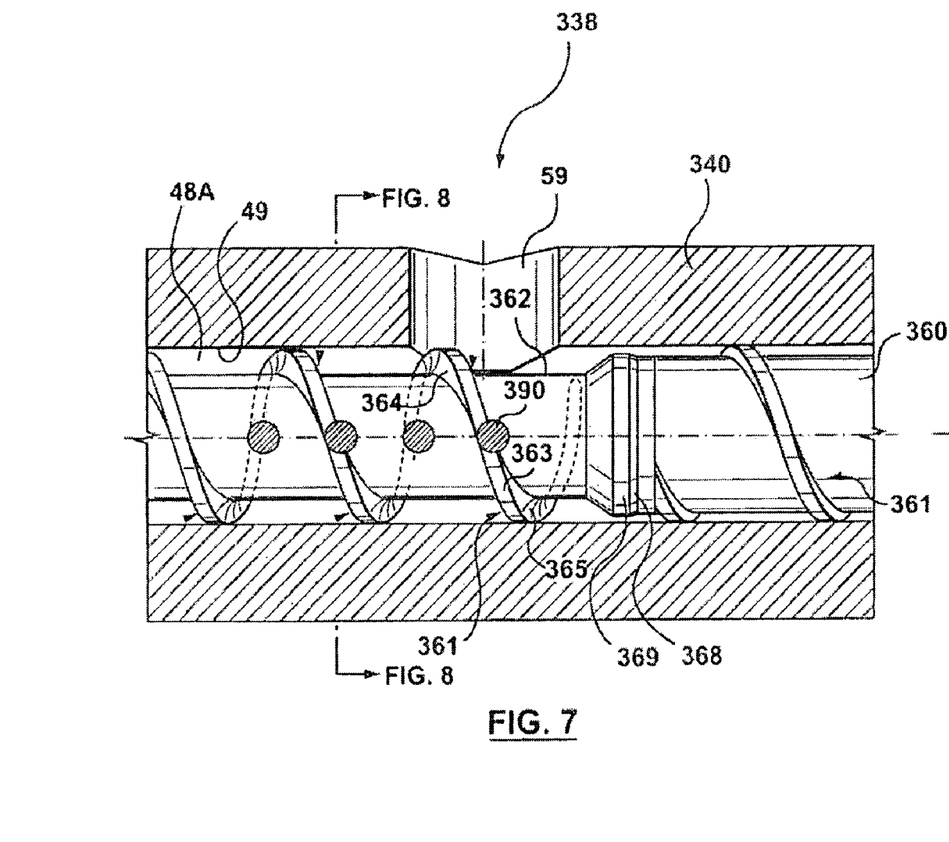
FIG. 7 is a partial section through a portion, in the vicinity of the auxiliary port/vent, of the barrel and screw of the extruder assembly that shows the screw wiping apparatus in accordance with a second alternative embodiment of the present invention.
Figure 8:
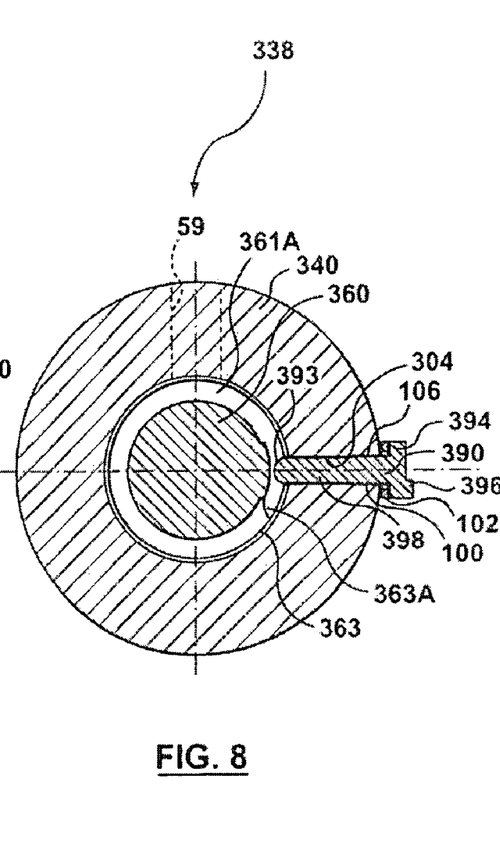
FIG. 8 is a cross-section through the extruder assembly, taken as indicated with reference to FIG. 7, that shows the screw wiping apparatus in accordance with the second alternative embodiment of the present invention.

Referring to FIGS. 7 and 8, a portion of an extruder assembly 338, in accordance with a second alternative embodiment of the present invention, is shown that includes a second alternative wiper for wiping the extruder screw 360 for alleviating the melt flow problem in the low pressure venting and entrainment extruder stage S6 adjacent the auxiliary port 59. The second alternative wiper is a minor variant on the preferred embodiment, the main distinction being the rounded profile of the projecting portion 393 and the shallower extent to which it projects into the screw passageway 48A. By contrast, instead of completely interrupting the screw flight 161 to provide discrete screw flight portions 161A, 161B, 161C, 161D, 161E, the screw flight 361 remains continuous, albeit having portions with a significantly reduced screw flight depth, by profiling the screw flight crest height 363 adjacent a row of static wiping elements 390. The screw flight crest profiled portion 363A is generally complementary in shape to the projecting portion 393 of the wiping element 390. Accordingly, the present embodiment is a compromise that provides a continuous screw flight 361 without having to retrofit the extrusion/injection unit 14 with a drive for reciprocating the wiping elements, as described hereinbefore, but with reduced screw root 362 wiping efficiency.

Preferably, the projecting portion 393, of the wiping elements 390, have a hemispherical contour. Accordingly, the screw flight crest 363 has a more gradual transition through the screw flight crest profiled potion 363A.

Figure 9:
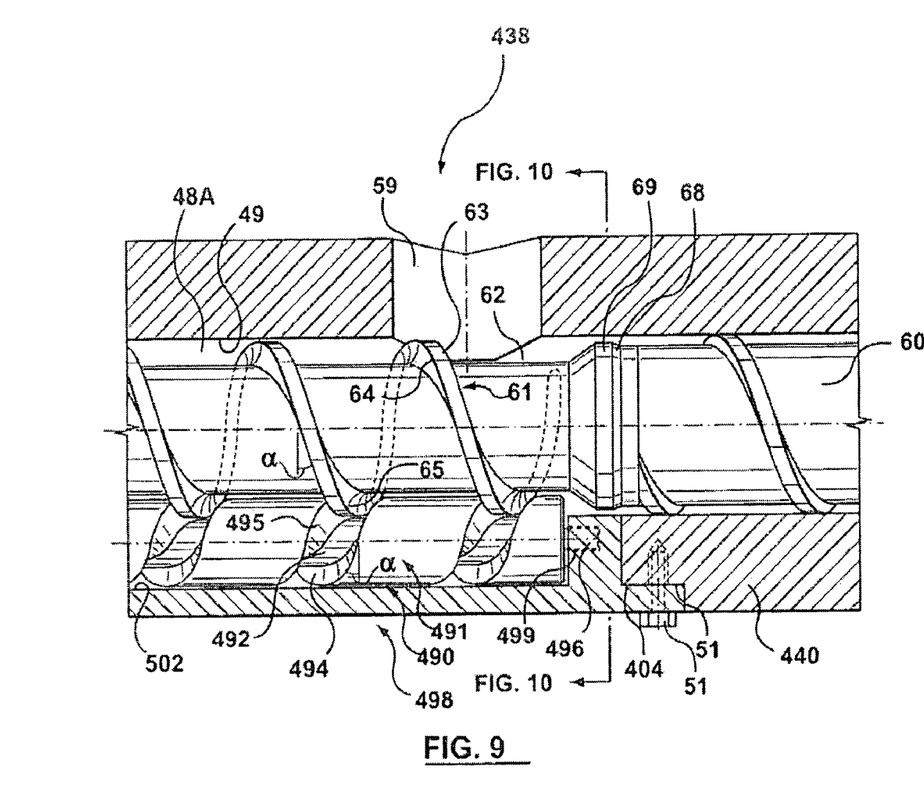
FIG. 9 is a partial section through a portion, in the vicinity of the auxiliary port/vent, of the barrel and screw of the extruder assembly that shows the screw wiping apparatus in accordance with a third alternative embodiment of the present invention.
Figure 10:
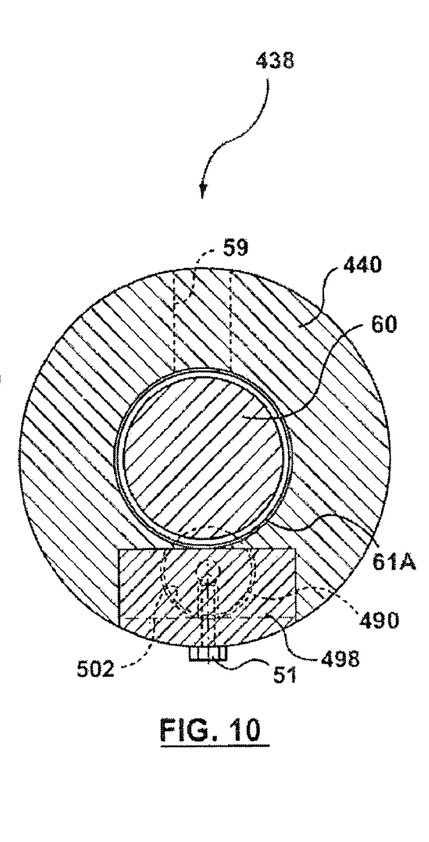
FIG. 10 is a cross-section through the extruder assembly, taken as indicated with reference to FIG. 9, that shows the screw wiping apparatus in accordance with the third alternative embodiment of the present invention.

Referring to FIGS. 9 and 10, a portion of an extruder assembly 438, in accordance with a third alternative embodiment of the present invention, is shown that includes a third alternative wiper for wiping the extruder screw 60 for alleviating the melt flow problem in the low pressure venting and entrainment extruder stage S6 adjacent the auxiliary port 59. As before, other than the provision for the wiper for wiping the extruder screw 60, the configuration and operation of the extruder assembly 438 is otherwise consistent with the description provided hereinbefore, for the experimental extruder assembly 38, and is accordingly intended for use in the in-line compounding molding system 10.

The third alternative wiper for wiping the extruder screw 60 includes a wiping element 490 that is arranged adjacent the extruder screw 60, spanning substantially the extent of the venting and entrainment extruder stage S6, and is configured for rotation, about a parallel rotational axis with the extruder screw 60, for wiping the compounding material (not shown) from substantially all portions of the extruder screw root and flight 62, 61 adjacent thereto.

Preferably, the wiping element 490 is configured as an auxiliary screw with a substantially complementarily configured screw flight 491 (i.e. same helix angle α and flight depth), to the extruder screw flight 61, extending therearound. Arranging the wiping element 490 in close proximity to the extruder screw 60 such that the screw flights 61, 491 are in an intermeshing relation provides for an effective wiping of substantially all portions of the extruder screw root and flight portions 62, 61 as they cooperate with the complementary screw root and flight portions 492, 491. An advantage of the present embodiment is that the wiping element 490 can be configured to cut long fibers (e.g. glass) into shorter lengths, which provides a reliable means for producing reinforcing fibers of a desired length in the extruder assembly from a filament feed of long fiber rovings 81 directly from the reel 80, as shown with reference to FIG. 1.

Preferably, the wiping element 490 is not driven by any external source but rather is driven in an opposite rotational direction to the extruder screw 60 by the extruder screw itself, through the interaction of the leading and trailing faces 494, 65, 495, 64 of the intermeshed screw flights 491, 61.

In more detail, the wiping element 490 includes coaxial spindles 496, arranged at the ends thereof, for rotationally supporting the wiping element 490 in a slot 502 that is provided in a housing 498. Preferably, the slot 502 is semi-cylindrical in shape, with its inner circumferential surface in a closely spaced relation with the wiping element 490. For receiving the housing 409, the extruder barrel 440 includes a complementary opening 404, arranged through a sidewall thereof. The barrel 440 also includes a set of suitably located tapped holes for receiving fasteners 51 for retaining the housing 498 in the opening 404.

Accordingly, the extruder assemblies 138, 238, 338, 438, in accordance with the present invention each include various embodiments of the wiper for wiping the screw 60, 160, 360 that address the problem of melt conveyance through the low pressure extruder stages.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, while the experiments discussed above were conducted using pre-chopped reinforcing fiber, a roving cutter 70, as generally described in European patent publication 0 960 715 and shown with reference to FIG. 1, could otherwise be used to cut fibers directly from the reel 80. Accordingly, the roving cutter 70 includes a pair of feed rolls 72 and 73 for advancing a filament of long fibers 81, from a reel 80, into the path of a set of blades 75 arranged about the outer surface of a rotating cutting roll 74, for cutting the filament into shorter reinforcing fibers 82. The reinforcing fibers 82 are directed into the auxiliary hopper 35 for subsequent introduction into the extruder as discussed hereinbefore. Alternatively, one or more filaments of long glass fibers may be combined using an assembly device 76 prior to being guided into the extruder by the auxiliary hopper 35.

Alternatively, the compounding process is intended to also encompass compounding materials that are flood fed.

Alternatively, the steps of extrusion and injection could be completed simultaneously by including a melt transfer step between the extruder assembly 38 and the injection assembly 29 wherein the screw is allowed to reciprocate (this will require, of course, either suitably configured clearance portions in the screw or a further degree of freedom for the longitudinal reciprocation of the wiping elements). Accordingly, the in-line compounding system 10 may be configured as a reciprocating screw extruder/injection apparatus without the need for a separate injection assembly 29.

Alternatively, the extruder assembly 38 may include a plurality of auxiliary ports/vents 59 for supporting a staged compounding process. Accordingly, the wiper of the present invention may be configured within one or more of the low pressure stages, adjacent the plurality of ports/vents 59, to assist in sustaining a melt flow therethrough.

Alternatively, the drive for reciprocating the wiping element could be an air, hydraulic, electromechanical, or any other variety of actuator. The drive could otherwise be configured to rotate or translate the wiping element.

Alternatively, the extruder assembly may include a side stuffer for the second compounding material.

Alternatively, the realm of suitable compounding materials is not limited to those recited herein.

Alternatively, the extruder assembly may have only a single wiping element, or any conceivable number or arrangement thereof (e.g. multiple lines of wiping elements).

Alternatively, the shape of the wiping elements, specifically their projecting portions, need not be generally cylindrical. For instance, the projecting portion of the wiping-elements could have more of a blade, or helical profile.

Alternatively, the wiping elements could be formed integrally with the barrel, preferably with a split or clam shell barrel construction.

Alternatively, the rotational wiping element could otherwise be driven by its own drive, which would also permit its co-rotation with the extruder screw to reduce the potential for screw wear and also to reduce melt shearing as required.

Alternatively, the extruder barrel head may be configured to include a die, for example, for pelletizing the compounded material.

Alternatively, the wiper of the present invention is used in a low pressure extruder stage of an extruder assembly with more than one extruder screw (e.g. twin screw compounding extruder).

Of course, the wiper of the present invention may be configured for use in any low pressure extruder stage where melt conveyance problems occur. For instance, the wiper of the present invention could alternatively be configured in the low pressure stage adjacent the primary feed throat 58.

All U.S. and foreign patent documents discussed above are hereby incorporated by reference into the Detailed Description of the Preferred Embodiment.

The individual components shown in outline or designated by blocks in the attached Drawings are all well-known in the molding arts, and their specific construction and operation are not critical to the operation or best mode for carrying out the invention.

What is claimed is:

1. A single screw compounding extruder assembly comprising:
    a barrel including:
        an inner surface providing a screw passageway extending through the barrel, the screw passageway configured to accommodate a single screw;
        a primary feed throat configured through a sidewall of the barrel, in proximity to a first end of the barrel, for accommodating, in use, the in-feeding of a first molding material into the screw passageway; and
        a heater for heating, in use, at least a portion of the barrel; and
        an auxiliary port configured through a sidewall of the barrel, intermediate the ends of the barrel, for accommodating, in use, the infeeding of a second molding material;
    a screw disposed within the screw passageway, the screw including:
        an elongate shank; and
        a screw flight helically disposed on an outer surface of the shank;
        the exposed outer surface of the shank adjacent the screw flight providing a screw root;
    a drive assembly arranged adjacent a first end of the barrel with an operative portion coupled to the first end of the screw; and
    a static wiping element slidably arranged in a bore that is provided in the barrel sidewall within a low pressure stage adjacent said auxiliary port;
    a projecting portion of the static wiping element being arrangeable within the screw passageway and being configured to cooperate, in use, with an adjacent screw portion for the wiping thereof;
    a drive, with an operative portion connected to the static wiping element, for the positioning of the static wiping element, between an extended and a retracted position, synchronously with the rotation of the screw whereby the projecting portion of the static wiping element that functions within the screw passageway may be intermittently retracted into the bore, in use, to avoid interfering with a screw flight portion passing therebeneath;

whereby the wiping of the screw portion improves melt conveyance through the low pressure extruder stage in the extruder barrel.

2. The single screw compounding extruder assembly in accordance with claim 1 wherein the projecting portion of the static wiping element has a cylindrically shaped rear face and a conveyance face provided as a shallow planar relief extending across the projecting portion generally parallel to a longitudinal axis of the static wiping element, the cylindrically shaped rear face is arranged upstream of the conveyance face and the conveyance face is arranged to be generally parallel to a helix angle of the screw flight.

3. The single screw compounding extruder assembly in accordance with claim 1 wherein a distal end of the static wiping element has a concave contour which closely follows that of the screw root when positioned in close proximity thereto.

4. The single screw compounding extruder assembly in accordance with claim 1 wherein the static wiping element is arranged to extend into the screw passageway in a substantially perpendicular orientation thereto.

5. The single screw compounding extruder assembly in accordance with claim 1 wherein a plurality of the static wiping elements are arranged in the low pressure stage of the extruder.

6. The single screw compounding extruder assembly in accordance with claim 5 wherein the plurality of the static wiping elements are in an equi-spaced linear arrangement within the low pressure stage of the extruder.

7. The single screw compounding extruder assembly in accordance with claim 1 wherein the screw portion to be wiped includes a portion of the screw root.

8. The single screw compounding extruder assembly in accordance with claim 1 wherein the drive for the positioning of the wiping element includes a spring for biasing the position of the static wiping element and a camming apparatus which drives and synchronizes the reciprocation of the static wiping element with the rotation of the screw.

9. The single screw compounding extruder assembly in accordance with claim 1 wherein the barrel is of a modular construction.

10. The single screw compounding extruder assembly in accordance with claim 9 wherein a barrel module including the wiper is of a split shell construction.

11. The single screw compounding extruder assembly in accordance with claim 1 wherein the screw further includes at least one mixer.

12. The single screw compounding extruder assembly in accordance with claim 1 wherein the screw further includes at least one shearing portion.

* * * * *